United States Patent

[11] 3,630,546

| [72] | Inventor | Leslie L. Church |
| | | 1058 W. Juliah Avenue, Flint, Mich. 48505 |
| [21] | Appl. No. | 50,068 |
| [22] | Filed | June 26, 1970 |
| [45] | Patented | Dec. 28, 1971 |

[54] LAND VEHICLE COUPLING MEANS
8 Claims, 4 Drawing Figs.

| [52] | U.S. Cl. | 280/511, 280/415 A |
| [51] | Int. Cl. | B60d 1/06 |
| [50] | Field of Search | 280/511, 415 A |

[56] References Cited
UNITED STATES PATENTS

| 2,438,749 | 3/1948 | Harrer | 280/511 |
| 2,911,233 | 11/1959 | Riddle | 280/415 |
| 3,307,857 | 3/1967 | Robertson | 280/511 |

*Primary Examiner*—Leo Friaglia
*Assistant Examiner*—Robert R. Song
*Attorney*—Kimmel, Crowell & Weaver ABSTRACT: A compound male coupling member for a ball-and-socket-type hitch, and wherein the member is composed of selectively exchangeable components coacting to form hitch balls each having a different diameter.

PATENTED DEC 28 1971 3,630,546
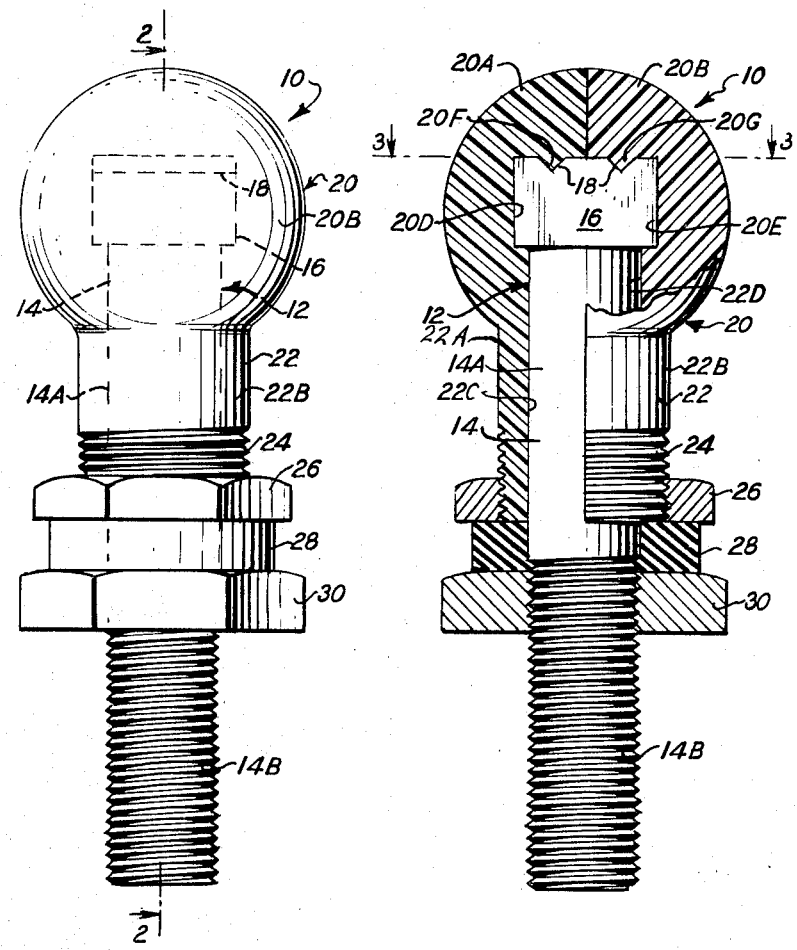
Fig-1
Fig-2
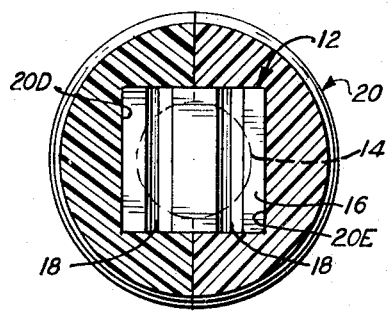
Fig-3
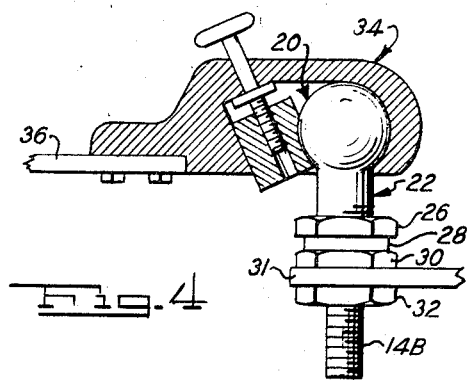
Fig-4
INVENTOR
LESLIE L. CHURCH
BY
Kimmel, Crowell & Weaver
ATTORNEYS

LAND VEHICLE COUPLING MEANS

BACKGROUND OF THE INVENTION

1. Field of the Invention

This invention relates to land vehicle coupling means of the ball-and-socket hitch type as is conventionally employed in coupling a house, boat or utility trailer in towing relationship with an automobile or other powered land vehicle.

2. Description of the Prior Art

Coupling means of the ball-and-socket hitch types for connecting together two or more land vehicles are old and well known in this art. Such coupling means, unfortunately has not been standardized and, as a consequence thereof, the male ball coupler of one hitch frequently cannot couple with the female socket member of another hitch, or if such coupling is effected, the connection therebetween may well prove to be dangerous.

As is frequently the case, when a hitch is used over a long period of time, the male ball member rusts in place on its associated drawbar or other means connecting it with the towing vehicle. This makes it difficult to remove in order to effect a suitable substitution for a different hitch, and such replacements are generally made only upon the expenditure of considerable energy and time.

Relevant prior art patents comprise the U.S. Pat. to Harry V. Riddle, No. 2,911,233, and the U.S. Pat. to Jesse E. Robertson, No. 3,307,857.

Riddle approaches this problem by mounting a plurality of male coupling members, each having a diameter differing from the others, on a turntable connected to a vehicle bumper by a special clamp means. This device adds to the overall length of the towing vehicle which, in turn, contributes to parking difficulties, and the patentee relies upon an impositive wingnut arrangement to hold the turntable fixed in an adjusted position.

Robertson truncates the hollow spherical male coupling member and then segmentalizes the remainder. The segments are sufficiently resilient so as to permit the free ends thereof to expand away from or contract towards the longitudinal axis of an internal wedge bolt in response to their positions relative to one another. This is the patentee's endeavor to form a ball-type male coupling member adjustable to provide varying outside diameters.

But it should here be noted that the segments of this male element cooperate in one position only to achieve a substantially spherical surface, and that in all other adjusted positions, the arcuate external bearing surfaces fail to define a substantially spherical or ball-shaped configuration since the curvature of each segment is fixed and the upper ends of the segments move radially with respect to the longitudinal axis of the wedge bolt. This results in the improper mating of the male and female members of the coupling means, except in the one special circumstance, and as a consequence undue wear requiring frequent replacement of the mating parts is necessary, and in some adjusted positions, the coupling could be considered dangerous as suggested above.

SUMMARY OF THE INVENTION

This invention proposes, as a primary object thereof, the provision of a land vehicle coupling device in the nature of a trailer hitch and, more specifically, the improvement of the male component thereof. In this connection it is proposed to provide a plurality of exchangeable male components for mounting on a common base bolt and wherein the cooperating male components define a ball-coupling member having a proper outside diameter for coupling with the socket of a ball-and-socket-type hitch.

The invention is practiced through the provision of an elongated headed connector bolt which has its headed end releasably encased in a split ball and necked male coupling member, together with means for holding the components of the member assembled on the bolt and against movement relative thereto, and wherein the components of the male connector member may be exchanged for other similar components wherein the diameter of the ball portion is increased or decreased for proper acceptance into the female socket component of the hitch.

Another object of this invention is to provide coupling means of the type generally described supra, the means being noncomplex in construction and assembly, inexpensive to manufacture and maintain, and one which is rugged and durable in use.

Other and further objects and advantages of the instant invention will become more manifest from a consideration of the following specification when read in the light of the annexed drawing.

BRIEF DESCRIPTION OF THE DRAWING

FIG. 1 is a side elevational view of a male ball connector member for a ball-and-socket-type hitch constructed in accordance with this invention;

FIG. 2 is a longitudinal medial cross-sectional view, partly in elevation, FIG. 2 being taken substantially on the plane of line 2—2 of FIG. 1, looking in the direction of the arrows;

FIG. 3 is a detail cross-sectional view taken substantially on the line 3—3 of FIG. 2, looking in the direction of the arrows; and FIG. 4 is a fragmentary cross-sectional view on a reduced scale showing the coupling means in a given operable condition.

DESCRIPTION OF THE PREFERRED EMBODIMENT

Referring now more specifically to the drawing, reference numeral 10 designates, in general, a male coupler member constructed according to the teachings of this invention and which is adapted for use in the usual ball-and-socket type of hitch.

The member 10 includes an elongated connector bolt 12 having an elongated substantially cylindrical shank 14 provided with a smooth cylindrical upper end portion 14A which is integrally connected at its lower end with a depending threaded lower end elements 14B. The upper end of the portion 14A terminates in an enlarged square head 16, and the upper end of the substantially 16 terminates in a plurality of identical V-shaped lock grooves 18 extending inwardly thereof and parallel with substantially to one another.

The member 10, in its assembled form, includes a hitch ball 20 and an integrally connected neck 22, the lower end of the latter being externally threaded as at 24. The neck 22 projects from the hitch ball 20 at its lower apex end. The hitch ball 20 and its neck 22 are formed of a two-piece assembly molded of any suitable plastic material; and being formed of plastic, there is no lubricating problem involved and wear on the socket is reduced.

The head 20 and neck 22 are symmetrical with respect to a bisecting plane which includes the longitudinal axis of the bolt. This provides a pair of identical semispherical members 20A, 20B and a pair of identical elongated semicylindrical elements 22A and 22B. The planar sides of the semispherical members 20A, 20B are each formed with an inwardly extending centrally located substantially rectangular pocket 20D and 20E, respectively, which are in open communication with the inner ends of elongated substantially concave recesses 22C, 22D formed, respectively, in the semicylindrical elements 22A and 22B. Each semispherical member is also formed with a substantially V-shaped rib 20F, 20G which extends into its adjacent pocket 20D and 20E, respectively.

As is seen in the drawing, the upper end of the bolt 12 is adapted to be encased in the semispherical members 20A, 20B and the semicylindrical elements 22A, 22B with the opposite sides of the head 16 being lodged in the pockets 20D, 20E, the ribs 20F, 20G entering and locking in the grooves 18, respectively. The smooth portion 14A of the bolt shank 14 is received within the concave recesses 22C, 22D, and the assembled structure is held together by a conventional nut 26 which is releasably threaded on the threads 24.

Following the nut 26 downwardly on the shank 14 is a collar 28, reference being made to FIGS. 1 and 2, formed of rubber or some other suitable flexible and resilient material, the collar having a leading end engaging the adjacent side of the nut 26. The collar 28 is followed downwardly by a nut 30 which when threaded upwardly, exerts a compression force on the trailing end of the collar 28 which, in turn, is exerted on the nut 26 tending to prevent its backing off or threading downwardly on the neck 24.

This comprises a description of the basic male ball connector member. As such, the threaded end portion 14B of the shank 14 may be passed through a suitable opening formed in an automobile drawbar 31 and locked or secured thereon by a locknut 32. The socket means 34 may then be connected on the hitch ball 20, all in the conventional manner, the socket means 34 being connected to the drawbar 36 of a vehicle (not shown) to be towed.

Now if the operator desires to effect a second hitch with another vehicle to be towed and having a hitch socket larger or smaller than may safely accept the ball hitch originally installed, the operator merely threads the nut 26 off the threads 24 against the bias of the collar 28 and removes the hitch members 20A, 20B and their connected elements 22A, 22B and substitutes a second corresponding pair therefor, the last mentioned pair having the desired outside diameter for the hitch ball 20. To make this substitution, the user must compress the nut 26 against the bias of the collar 28 before the nut can be started upwardly on the threads 24.

By molding the semispherical members 20A, 20B to provide the spherical or ball heads 20 having differing outside diameters, it will be understood that the pockets and recesses remain unchanged, and that the outside diameter of the neck 22 will remain constant and with the same threads 24 whereby the same nut 26 may be employed regardless of the change of the outside diameter of the head 20.

The above-described assembly facilitates the change in a ball-and-socket hitch assembly since the bolt 14 need never be removed from a towing vehicle.

Having described and illustrated one preferred embodiment of this invention, it will be understood that the same is offered merely by way of example, and that this invention is to be limited only by the scope of the appended claims.

What is claimed is:

1. A compound male ball coupling member for a ball-and-socket-type vehicle hitch assembly, said coupling member comprising:

an elongated bolt having an elongated shank provided with opposite end portions, one of said end portions terminating in an enlarged head, and means on the other end portion for effecting connection of said bolt on a vehicle;

a pair of identical semispherical members each having an identical semicylindrical element projecting laterally and outwardly from an apex thereof, each of said semispherical members and its associated element having a common planar side;

said semispherical members and said semicylindrical elements being mounted on said bolt with their planar sides being coincident to releasably encase said head and said one end portion of said shank, and cooperating with one another to form said male ball with a laterally projecting cylindrical neck at said apex thereof; and means engaging around said neck to releasably secure said members and elements on said bolt, whereby said semispherical members and semicylindrical elements can be removed and other semispherical members and semicylindrical elements, forming a ball with a different outside diameter, substituted.

2. A coupling member as defined in claim 1 wherein;

each of aid semispherical members has a pocket formed therein extending inwardly from its planar side to receive, respectively, a part of said bolt head therein; and each of said semicylindrical elements having a convex recess formed in its planar side and extending in the direction of its longitudinal axis, each of said recesses extending from end to end of its respective semicylindrical element and opening in the adjacent one of said pockets, said recesses each receiving a portion, respectively, of said one shank portion therein.

3. A coupling member as defined in claim 2 and:

means for preventing said ball and neck from rotating around the longitudinal axis of said bolt, said means comprising:

forming said bolt head with a plurality of grooves; and forming each of said first defined with at least one rib projecting, respectively, into its associated pocket for engagement with, respectively, one of said grooves.

4. A coupling member as defined in claim 3 wherein:

said releasable securing means includes a screw thread formed on said neck; and a first nut threadedly engaged on said screw thread.

5. A coupling member as defined in claim 4 wherein:

said releasable securing means further includes means on said neck engaging said first nut to prevent said first nut from backing or threading off said neck.

6. A coupling member as defined in claim 5 wherein:

said releasable securing means further includes a flexible and resilient element mounted on said neck and engaging said trailing end of said first nut.

7. A coupling member as defined in claim 6 wherein:

said releasable securing means further comprises a collar on said shank, said collar having an end abutting said trailing end of said nut; and a second nut threaded on said other shank end portion and having an end engaging said collar to compress said collar against said first nut.

8. A coupling member as defined in claim 7 and:

a second pair of semispherical members and connected semicylindrical elements for substitution for said first pair of semispherical members and semicylindrical elements, said second members forming a ball, when assembled on said bolt, having an outside diameter different from that of the first ball.

* * * * *